US012659594B2

(12) United States Patent
Stead

(10) Patent No.: US 12,659,594 B2
(45) Date of Patent: Jun. 16, 2026

(54) SYSTEMS AND METHODS FOR MULTI-SPECTRAL IMAGING WITH A NON-MECHANICAL ADJUSTABLE APERTURE

(71) Applicant: Stryker Corporation, Kalamazoo, MI (US)

(72) Inventor: Robert Anthony Stead, North Vancouver (CA)

(73) Assignee: Stryker Corporation, Portage, MI (US)

( * ) Notice: Subject to any disclaimer, the term of this patent is extended or adjusted under 35 U.S.C. 154(b) by 197 days.

(21) Appl. No.: 18/335,999

(22) Filed: Jun. 15, 2023

(65) Prior Publication Data

US 2023/0421912 A1     Dec. 28, 2023

Related U.S. Application Data

(60) Provisional application No. 63/366,920, filed on Jun. 23, 2022.

(51) Int. Cl.
| | |
|---|---|
| *H04N 23/73* | (2023.01) |
| *G02F 1/00* | (2006.01) |
| *G02F 1/03* | (2006.01) |
| *G02F 1/1335* | (2006.01) |

(Continued)

(52) U.S. Cl.
CPC ........... *H04N 23/73* (2023.01); *G02F 1/0327* (2013.01); *G02F 1/133528* (2013.01); *G02F 1/137* (2013.01); *G02F 1/0136* (2013.01)

(58) Field of Classification Search
CPC .... H04N 23/73; G02B 5/005; G02B 23/2484; G02B 13/0075; G02B 27/0081; G02B 27/0075; G02F 1/0136; G02F 1/137; G02F 1/133528; G02F 1/0327
See application file for complete search history.

(56) References Cited

U.S. PATENT DOCUMENTS

| | | | |
|---|---|---|---|
| 5,097,352 | A | 3/1992 | Takahashi |
| 9,173,554 | B2 | 11/2015 | Fengler |
| 9,759,984 | B1 | 9/2017 | Xu et al. |

(Continued)

FOREIGN PATENT DOCUMENTS

| | | | | |
|---|---|---|---|---|
| CA | 3150305 A1 | * | 3/2021 | ............. G01S 19/26 |
| JP | H09128795 A | | 5/1997 | |

OTHER PUBLICATIONS

International Search Report and Written Opinion mailed Oct. 2, 2023, directed to International Application No. PCT/US2023/068546; 18 pages.

(Continued)

*Primary Examiner* — Kelly L Jerabek
(74) *Attorney, Agent, or Firm* — Morrison & Foerster LLP

(57) ABSTRACT

An adjustable aperture for an imager includes a mechanical aperture having an opening for permitting light to pass through the mechanical aperture; and an electro-optic shutter having a hole in at least one linearly polarizing layer such that at least a portion of light incident on the electro-optic shutter can pass through the electro-optic shutter regardless of an operating state of the electro-optic shutter, wherein an aperture size of the adjustable aperture is defined by the mechanical aperture when the electro-optic shutter is controlled for light transmission and by the electro-optic shutter when the electro-optic shutter is controlled for light blocking.

39 Claims, 9 Drawing Sheets

(51) Int. Cl.
*G02F 1/137*      (2006.01)
*G02F 1/01*      (2006.01)

(56)      References Cited

U.S. PATENT DOCUMENTS

| | | | |
|---|---|---|---|
| 9,851,613 B2 | 12/2017 | Noble | |
| 10,018,890 B2 | 7/2018 | Toriumi | |
| 10,365,554 B1 | 7/2019 | Mcdowall | |
| 2007/0025727 A1 | 2/2007 | Matusik et al. | |
| 2007/0242201 A1 | 10/2007 | Hyatt | |
| 2008/0084498 A1 | 4/2008 | He et al. | |
| 2009/0244482 A1* | 10/2009 | Elsner | A61B 3/1025 |
| | | | 351/206 |
| 2015/0309225 A1 | 10/2015 | Moore | |
| 2018/0325620 A1 | 11/2018 | Mak | |
| 2019/0208183 A1* | 7/2019 | Schmidt | G01S 17/894 |
| 2022/0019126 A1* | 1/2022 | Peana | H04N 7/18 |
| 2022/0142458 A1* | 5/2022 | Kashima | A61B 1/000096 |
| 2022/0232156 A1* | 7/2022 | Skorka | H04N 23/73 |

OTHER PUBLICATIONS

Takano Co., Ltd. (2015) "Bi-stable Optical Shutter," located at https://www.takano-sanki21.com/sanki/en/products/optical-shutter/. (4 pages).

\* cited by examiner

SYSTEMS AND METHODS FOR MULTI-SPECTRAL IMAGING WITH A NON-MECHANICAL ADJUSTABLE APERTURE

CROSS-REFERENCE TO RELATED APPLICATIONS

This application claims the benefit of U.S. Provisional Application No. 63/366,920, filed Jun. 23, 2022, the entire contents of which are hereby incorporated by reference herein.

FIELD

This disclosure generally relates to medical imaging, and more particularly, to multi-spectral medical imaging.

BACKGROUND

In conventional medical imaging systems, the F-number is controlled by varying the size of an aperture through which light passes at the stop-plane of the imaging lens. This is usually done using a mechanically variable aperture, or iris, consisting of many thin overlapping vanes. The mechanical nature of this component means that the speed with which the aperture size can be varied is relatively slow, typically of the order of a second. This is far longer than the duration of the typical video frame of conventional medical video systems, which often run at frame rates of at least 60 Hz (16-millisecond frame duration).

Many multi-spectral imaging systems acquire images in different spectral bands at different times and then combine the images for display at a video rate that is less than the native acquisition rate of the sensor. Further, the applications of these systems often require large dynamic ranges because the amount of light reaching the sensor may be relatively low in at least one spectral band. This is the case for a typical fluorescence imaging system in which the amount of fluorescence light available for capturing a fluorescence image is much lower than the amount of visible light available for capturing a visible light image over which the fluorescence image is to be overlaid.

The slow rate at which it is possible to adjust the aperture size of a conventional mechanical aperture imaging system typically means that all spectral bands must be acquired with the same size aperture, since there is not enough time to make the aperture adjustment in the 16-millisecond frame duration of a 60 Hz acquisition system. This means that fluorescence images are often captured with a suboptimal F-number.

SUMMARY

According to an aspect, an adjustable aperture for a medical imager can vary a size of the aperture electronically, without any moving parts. This allows the F-number of the system to be varied at video rates, so that video images can be captured at different aperture settings, allowing prioritization of sensitivity or depth of field as desired for each frame. The adjustable aperture can include a mechanical aperture that has a first hole that defines a first aperture size and an electro-optic shutter that has a second hole that defines a second, smaller, aperture size. The electro-optic shutter can be switchably controlled for blocking or passing light, but the hole in the electro-optic shutter is such that light always passes through the hole regardless of the operational state of the electro-optic shutter. When the electro-optic shutter is controlled for blocking light, light passes only through the smaller hole of the electro-optic shutter. When the electro-optic shutter is controlled for light transmission, light passes through not only the smaller hole of the electro-optic shutter, but also the annular portion between the smaller hole and the larger hole of the mechanical aperture. Thus, when the electro-optic shutter is controlled for blocking light, the aperture size is defined by the smaller hole of the electro-optic shutter and when the electro-optic shutter is controlled for light transmission, the aperture size is defined by the larger hole of the mechanical aperture. The electro-optic shutter can be switched from light blocking to light transmission and vice versa by adjusting the electric field applied across, for example, a liquid crystal layer. This switching can be done at high rates, meeting or exceeding even the fastest video frame rates, meaning that the aperture size can be adjusted between video image captures.

According to an aspect, an adjustable aperture for an imager includes a mechanical aperture having an opening for permitting light to pass through the mechanical aperture; and an electro-optic shutter having a hole in at least one linearly polarizing layer such that at least a portion of light incident on the electro-optic shutter can pass through the electro-optic shutter regardless of an operating state of the electro-optic shutter, wherein an aperture size of the adjustable aperture is defined by the mechanical aperture when the electro-optic shutter is controlled for light transmission and by the electro-optic shutter when the electro-optic shutter is controlled for light blocking.

Optionally, the electro-optic shutter comprises two linearly polarizing layers that both have the hole.

Optionally, the hole extends through each layer of the electro-optic shutter.

Optionally, the mechanical aperture is positioned on a surface of the electro-optic shutter.

Optionally, the opening of the mechanical aperture is fixed in size.

Optionally, the electro-optic shutter comprises a liquid crystal shutter.

Optionally, the electro-optic shutter comprises a Pockels cell.

Optionally, the electro-optical shutter can be controlled to switch the aperture size at a video frame rate.

According to an aspect, an imaging system includes at least one imaging sensor; an adjustable aperture, the adjustable aperture comprising: a mechanical aperture having an opening for permitting light to pass through the mechanical aperture, and an electro-optic shutter having a hole in at least one linearly polarizing layer such that at least a portion of light directed through the hole in the at least one linearly polarizing layer can pass through the electro-optic shutter regardless of the operating state of the electro-optic shutter, wherein an aperture size of the adjustable aperture is defined by the mechanical aperture when the electro-optic shutter is controlled for light transmission and by the electro-optic shutter when the electro-optic shutter is controlled for light blocking; and a controller comprising one or more processors configured to control the adjustable aperture to adjust the aperture size.

Optionally, the controller can control the electro-optical shutter to adjust the aperture size at a video frame rate of the at least one imaging sensor. The video frame rate can be, for example, at least 60 frames per second.

Optionally, the system is configured for capturing a series of frames in alternating spectral bands, and the controller is configured for controlling the adjustable aperture such that the aperture size is defined by the mechanical aperture for at least a first spectral band, and by the electro-optic shutter for at least a second spectral band that is different than the first spectral band. The first spectral band may be a fluorescence light band and the second spectral band may be a visible light band. Optionally, the fluorescence light band is within or overlaps the visible light band.

Optionally, the electro-optic shutter comprises two linearly polarizing layers that both have the hole.

Optionally, the hole extends through each layer of the electro-optic shutter.

Optionally, the mechanical aperture is positioned on a surface of the electro-optic shutter.

Optionally, the opening of the mechanical aperture is fixed in size.

Optionally, the electro-optic shutter comprises a liquid crystal shutter.

Optionally, the electro-optic shutter comprises a Pockels cell.

Optionally, the electro-optical shutter can be controlled to switch the aperture size at least at a frame rate of video generated by the imaging system.

According to an aspects, a method for imaging using an imager having an adjustable aperture includes capturing a first image while controlling an electro-optic shutter for light blocking such that a hole in at least one linearly polarizing layer of the electro-optic shutter defines an aperture size for the first image; and capturing a second image while controlling the electro-optic shutter for light transmission such that an opening in a mechanical aperture defines the aperture size for capturing the second image.

Optionally, the method further includes generating a video using the first and second images.

Optionally, the first and second images are captured sequentially and combined into a frame of the video.

Optionally, the first and second images are captured sequentially at least at 60 frames per second.

Optionally, the first image is generated from light having a first spectral band and the second image is generated from light having a second spectral band that is different than the first spectral band. The first spectral band may be a visible light band and the second spectral band may be a fluorescence light band. Optionally, the fluorescence light band is within or overlaps the visible light band.

Optionally, the electro-optic shutter comprises two linearly polarizing layers that both have the hole.

Optionally, the hole extends through each layer of the electro-optic shutter.

Optionally, the mechanical aperture is positioned on a surface of the electro-optic shutter.

Optionally, the opening of the mechanical aperture is fixed in size.

Optionally, the electro-optic shutter comprises a liquid crystal shutter.

Optionally, the electro-optic shutter comprises a Pockels cell.

It will be appreciated that any of the variations, aspects, features and options described in view of the systems apply equally to the methods and vice versa. It will also be clear that any one or more of the above variations, aspects, features and options can be combined.

BRIEF DESCRIPTION OF THE FIGURES

The invention will now be described, by way of example only, with reference to the accompanying drawings, in which.

DETAILED DESCRIPTION

Figure 1:
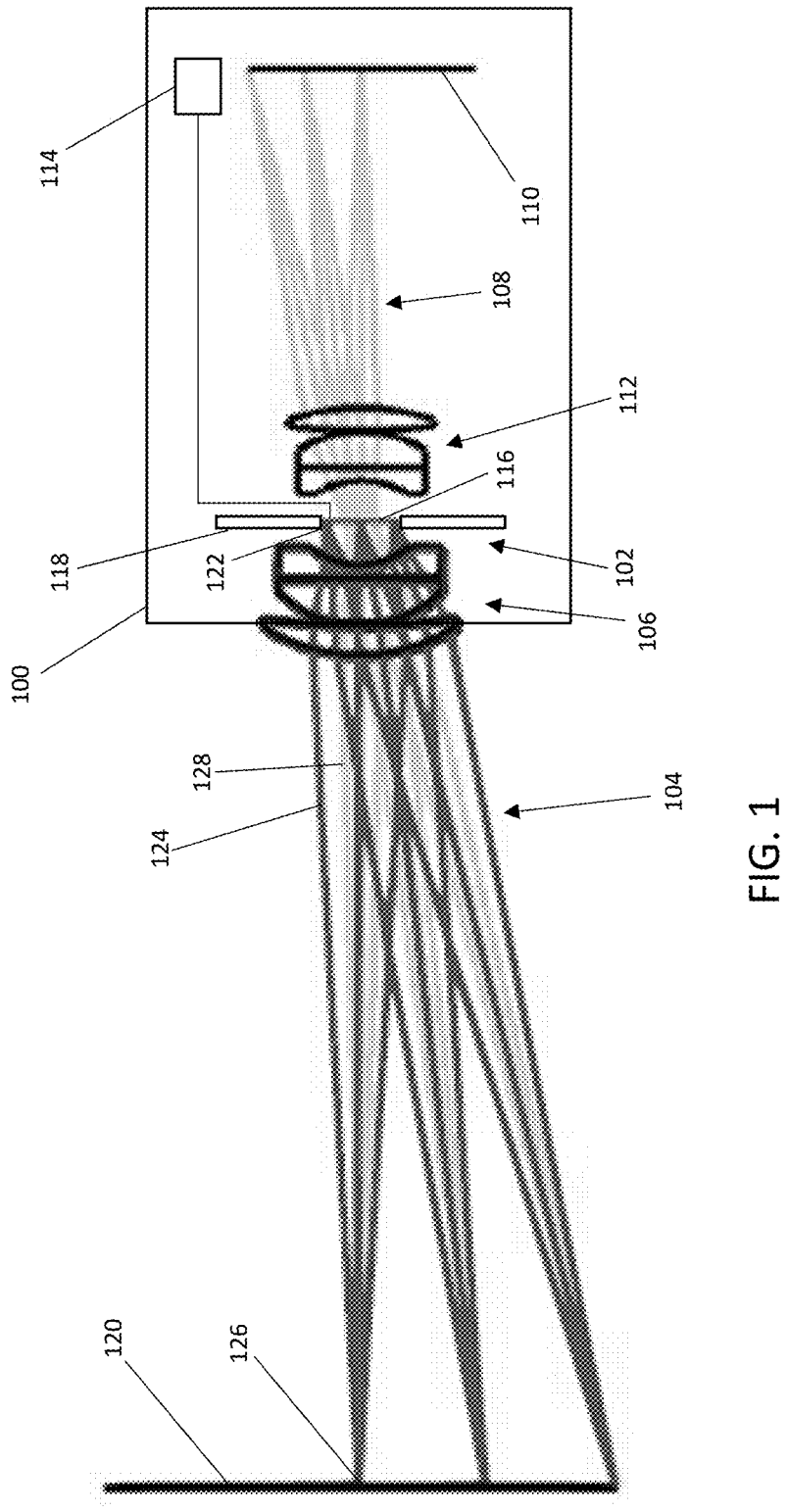
FIG. 1 illustrates a portion of an imaging light pathway of an exemplary imager that has an adjustable aperture configured for non-mechanically switching between at least two different aperture sizes.

Reference will now be made in detail to implementations and examples of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Disclosed herein are systems and methods for adjusting the size of an imaging aperture without any moving parts, thereby increasing reliability and reducing the need for precision tolerances. An adjustable imaging aperture includes an electro-optic shutter that can be controlled to block or transmit light. The electro-optic shutter has a hole in at least one of its layers such that at least some light can pass regardless of the state of the electro-optic shutter. When the electro-optic shutter is controlled to block light, light passes only through the hole such that the hole defines the aperture. When the electro-optic shutter is controlled for light transmission, at least some of the light outside of the hole can pass and a mechanical aperture adjacent to the electro-optic shutter defines a second, larger aperture size. With this arrangement, the aperture size can be switched between the size defined by the hole of the electro-optic shutter and the size defined by the mechanical aperture simply by switching the operational state of the electro-optic shutter. Thus, aperture size can be switched without any moving parts. The adjustable apertures described herein can allow the aperture setting to be quickly and repeatedly varied between the required settings without any perceived delay or change in image brightness to the user.

The adjustable aperture allows the aperture setting to be varied at high rates, approaching or exceeding imaging frame rates, allowing the aperture to be adjusted between imaging frames. As is well known in the art, the ratio of the focal length to the diameter of the aperture of an imager (known as the F-number) affects the sensitivity and the depth of field in opposite ways—a smaller aperture allows less light to the image sensor, reducing sensitivity, but increasing depth of field because effects of lens aberrations are reduced. Adjusting the aperture size, according to the principles described herein, allows for the balancing of sensitivity and field of view for a particular scene brightness at high rates.

For instance, image brightness can be maintained under conditions of rapidly varying scene brightness. Additionally, for multispectral imaging systems, e.g. employing frame interlacing of images acquired in different spectral bands, the adjustable aperture allows one or more spectral bands to be acquired at different aperture settings. For example, a fluorescence imaging system that combines fluorescence image data with visible light image data may acquire visible image information at a higher F-number and fluorescence image data with a smaller F-number. The higher F-number when acquiring visible light image information prioritizes depth of field, which can improve sharpness of the entire scene, over sensitivity, which is less of a concern with an adequately illuminated scene. The lower F-number when acquiring the fluorescence image data allows more light to reach the sensor, giving greater sensitivity to the lower fluorescence intensity. The resulting relative loss of depth of field may have little effect due to the relatively low spatial resolution of fluorescence image data.

The adjustable aperture includes a mechanical aperture made from an opaque material. The mechanical aperture includes a hole of diameter D through which light can pass. The adjustable aperture also includes an electro-optic shutter that is adjacent to the mechanical aperture (positioned either behind or in front of the mechanical aperture with respect to the direction of light travel) and can be controlled for light blocking or light passing. The electro-optic shutter includes a hole of diameter d<D that permits at least some light to pass through the electro-optic shutter regardless of its operational state. When the electro-optic shutter is controlled for light blocking, the hole of diameter d defines the aperture size, and when the electro-optic shutter is controlled for light transmission, the hole of diameter D defines the aperture size. Thus, the aperture size can be switched between d and D by switching the state of the electro-optic shutter.

The electro-optic shutter can include a polarization rotator (also referred to herein as a variable-wave retarder) that can be selectively controlled via an electrical signal to rotate the polarization of light passing through it. The polarization rotator can be sandwiched between two linear polarizers that have their transmission axes orthogonal to one another. The first linear polarizer passes light polarized according to a first transmission axis. When the polarization rotator is controlled to rotate the polarization of the light, the polarization of the light that passed through the first linear polarizer is rotated ninety degrees. This light can then pass through the second linear polarizer since its polarization is aligned with the transmission axis of the second linear polarizer, which is orthogonal to the first transmission axis. In contrast, when the polarization rotator is controlled for not rotating the polarization of the light from the first linear polarizer, the light is blocked by the second linear polarizer because its polarization is orthogonal to the transmission axis of the second linear polarizer. Thus, when the polarization rotator is controlled for not rotating the polarization of the light passing through it, the electro-optic shutter blocks light incident on the electro-optic shutter between d and D, and when the polarization rotator is controlled for rotating the polarization of the light passing through it, the electro-optic shutter passes a portion of the light incident on the electro-optic shutter between d and D. Because the first linear polarizer will filter about 50% of the light incident upon it regardless of the operational state of the polarization rotator, the electro-optic shutter will pass at most about 50% of the light incident on it between d and D when controlled for light passing.

At least one of the linear polarizers has a hole of diameter d such that at least some of the light incident on the electro-optic shutter travels through the electro-optic shutter regardless of the state of the polarization rotator. In some variations, the hole may be provided through both linear polarizers, in which case, all light traveling along a path that extends within the hole passes through the electro-optic shutter, regardless of the operational state of the electro-optic shutter. In some variations, the hole may be provided in only one of the linear polarizers, in which case about 50% of the light is blocked by the linear polarizer that does not have the hole and the other 50% passes through regardless of the operation state of the electro-optic shutter.

When depth of field is to be prioritized over sensitivity, a control voltage can be applied to the polarization rotator such that the phase delay imparted to the electromagnetic field results in no rotation of the electromagnetic field transmitted by the first linear polarizer. The light transmitted by the first polarizer and polarization rotator is then blocked by the second polarizer having its transmission axis orthogonal to that of the first linear polarizer. The net result is that light is only transmitted through the smaller central hole having diameter d. This smaller diameter is then the aperture size of the imaging system.

If sensitivity is to be prioritized over depth of field, for example in a fluorescence image frame, the control voltage can be applied such that a ninety degree phase shift is imparted on a component of the electric field at forty-five degrees to that transmitted by the first linear polarizer. This rotates the polarization of the light as it passes through the polarization rotator, such that it is then polarized in the plane transmitted by the second linear polarizer. The net result is that light is transmitted through the larger aperture of diameter D determined by the mechanical aperture. Since the system aperture is now physically larger, the F-number of the imaging system is smaller, meaning a brighter image with shallower depth of field. The electro-optic shutter can be controlled, therefore, to switch between the two aperture size settings without any moving parts and at relatively high rates, enabling aperture size adjustment from frame to frame.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to herein may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates a portion of an imaging light pathway of an exemplary imager 100 that has an adjustable aperture 102 configured for non-mechanically switching between at least two different aperture sizes. Light 104 received by the imager 100 from a scene 120 passes through one or more upstream optical components 106 to the adjustable aperture 102. A portion 108 of the light incident on the adjustable aperture passes through the adjustable aperture 102 and then through one or more downstream optical components 112 to one or more imaging sensors 110.

The amount of light that passes through the adjustable aperture 102 and reaches the one or more imaging sensors 110 is dependent on the size of the aperture, which can be switched via a control signal from a controller 114 of the imager 100 that is applied to the adjustable aperture 102. The adjustable aperture 102 can be configured to switch between a smaller aperture size 116 for imaging in which greater depth of field is preferred, such as visible light imaging, and a larger aperture size 122 for imaging in which greater sensitivity is preferred, such as fluorescence imaging.

FIG. 1 illustrates the adjustable aperture 102 in its smaller aperture size configuration in which light is only passing within aperture size 116. A ray 124 (shown in dark grey) of light from a point 126 of the scene 120 that is incident on the adjustable aperture 102 outside of its smaller aperture size 116 is blocked by the adjustable aperture 102. A ray 128 (shown in light grey) of light from the same point 126 of the scene that is incident on the adjustable aperture 102 within the smaller aperture size 116 passes through the adjustable aperture 102 to the imaging sensor(s) 110. If the adjustable aperture 102 were set to its larger aperture size 122 (defined by mechanical aperture 118), the ray 124 that was blocked by the smaller aperture size 116 would pass to the imaging sensor 110.

Figure 2:
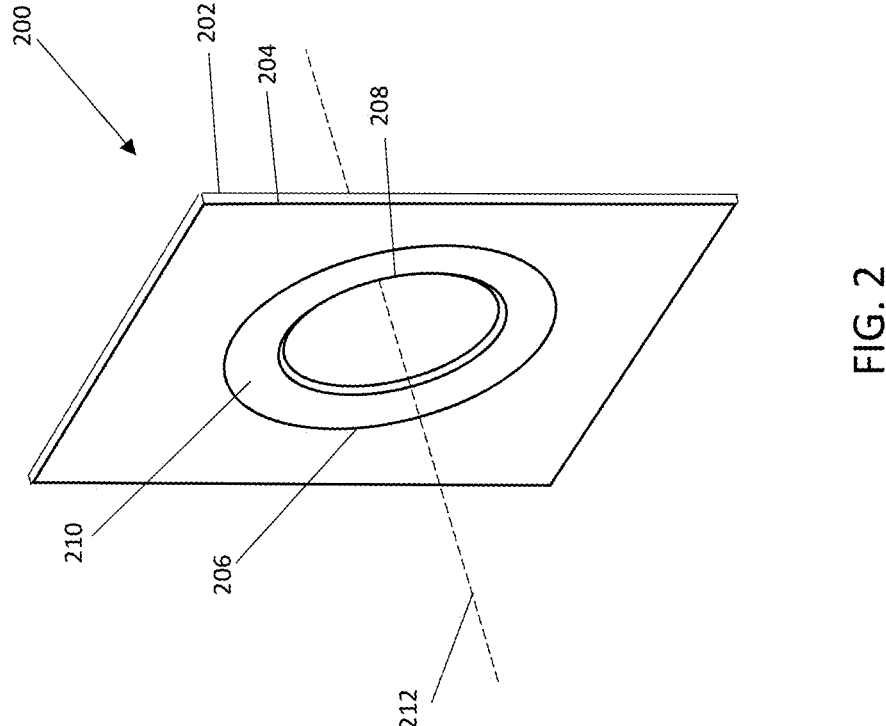
FIG. 2 is a schematic illustrating an exemplary adjustable aperture.

FIG. 2 is a schematic illustrating an exemplary adjustable aperture 200 that can be used for adjustable aperture 102 of imager 100 of FIG. 1. The adjustable aperture 200 is configured for non-mechanically switching between at least two different aperture sizes. Adjustable aperture 200 includes an electro-optic shutter 202 and a mechanical aperture 204 disposed on a side of the electro-optic shutter 202. The mechanical aperture 204 is made of an opaque material and has a central hole 206 such that light traveling along an optical pathway having axis 212 that is incident on the mechanical aperture 204 outside of the central hole 206 is blocked. The central hole 206 has a diameter D. In some variations, the size of the central hole 206 is fixed. In other variations, the mechanical aperture 204 may be configured to adjust the size of the central hole 206. For example, the mechanical aperture 204 may be configured as a mechanical iris.

The electro-optic shutter 202 is configured to selectively pass or block light depending on a control signal applied to the electro-optic shutter 202. The electro-optic shutter 202 has a hole 208 through which light can always pass regardless of the operational state of the electro-optic shutter. Hole 208 has a diameter d that is less than the diameter D of the hole 206 of the mechanical aperture 204. When the electro-optic shutter 202 is controlled for light blocking, light passes only through the hole 208 of the electro-optic shutter 202 and, as a result, the hole 208 defines the aperture size of the adjustable aperture 200. In contrast, when the electro-optic shutter 202 is controlled for light transmission, light passes not only through the hole 208 in the electro-optic shutter 202 but also through the annular region 210 between the hole 208 of the electro-optic shutter 202 and the hole 206 of the mechanical aperture 204. As such, when the electro-optic shutter 202 is controlled to pass light, the hole 206 of the mechanical aperture 204 defines the aperture size of the adjustable aperture 200. Thus, by switching the electro-optic shutter 202 between light passing and light blocking, the aperture size can be switched between a size of diameter D of the hole 206 of the mechanical aperture 204 and a size of diameter d of the hole 208 of the electro-optical shutter.

Figure 3A:
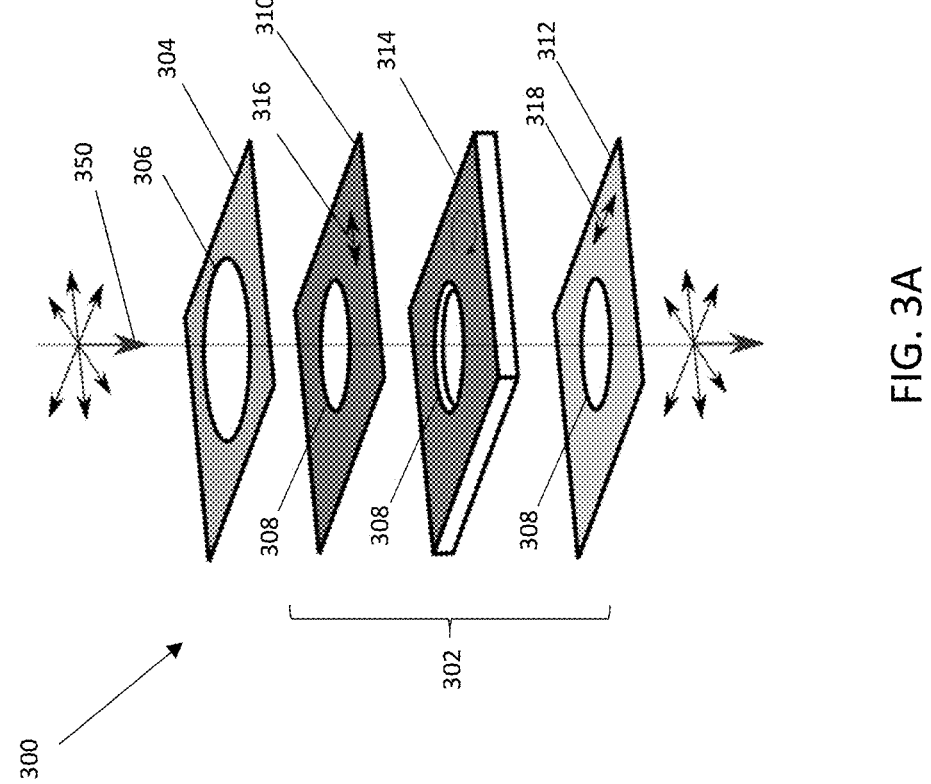
FIGS. 3A-3C are exploded views of an exemplary adjustable aperture illustrating the passage of light in various operational states of the adjustable aperture.

FIG. 3A is an exploded view of the components of an exemplary adjustable aperture 300 that can be used for adjustable aperture 200 of FIG. 2. In the example of FIG. 3A, light from a scene travels through the adjustable aperture 300 in direction 350. The first component encountered by the light can be the mechanical aperture 304, which only permits light that is within hole 306 to pass.

Light passing through the hole 306 then encounters the electro-optic shutter 302. The electro-optic shutter 302 includes three main optical layers—a first linear polarizer 310, a second linear polarizer 312, and a polarization rotator 314 disposed between the two linear polarizers 310, 312. The polarization rotator 314 can be controlled via a control signal applied to electrodes of the polarization rotator 314 such that the electro-optic shutter 302 either blocks or passes light incident on the electro-optic shutter 302 that is radially outward of hole 308 of the electro-optic shutter 302. In the illustrated example, each of the three main layers includes hole 308 (which as noted above is smaller than hole 306). Light 320 passes through the hole 308 regardless of the operational state of the polarization rotator 314.

The first linear polarizer 310 has its transmission axis 316 oriented in a first direction and the second linear polarizer 312 has its transmission axis 318 oriented in a second direction that is orthogonal to that of the transmission axis 316 of the first linear polarizer 310. The polarization rotator 314 can be controlled via a control signal to rotate the electromagnetic field of the light passing through it or not to rotate the electromagnetic field of the light passing through it.

Figures 3B, 3C:
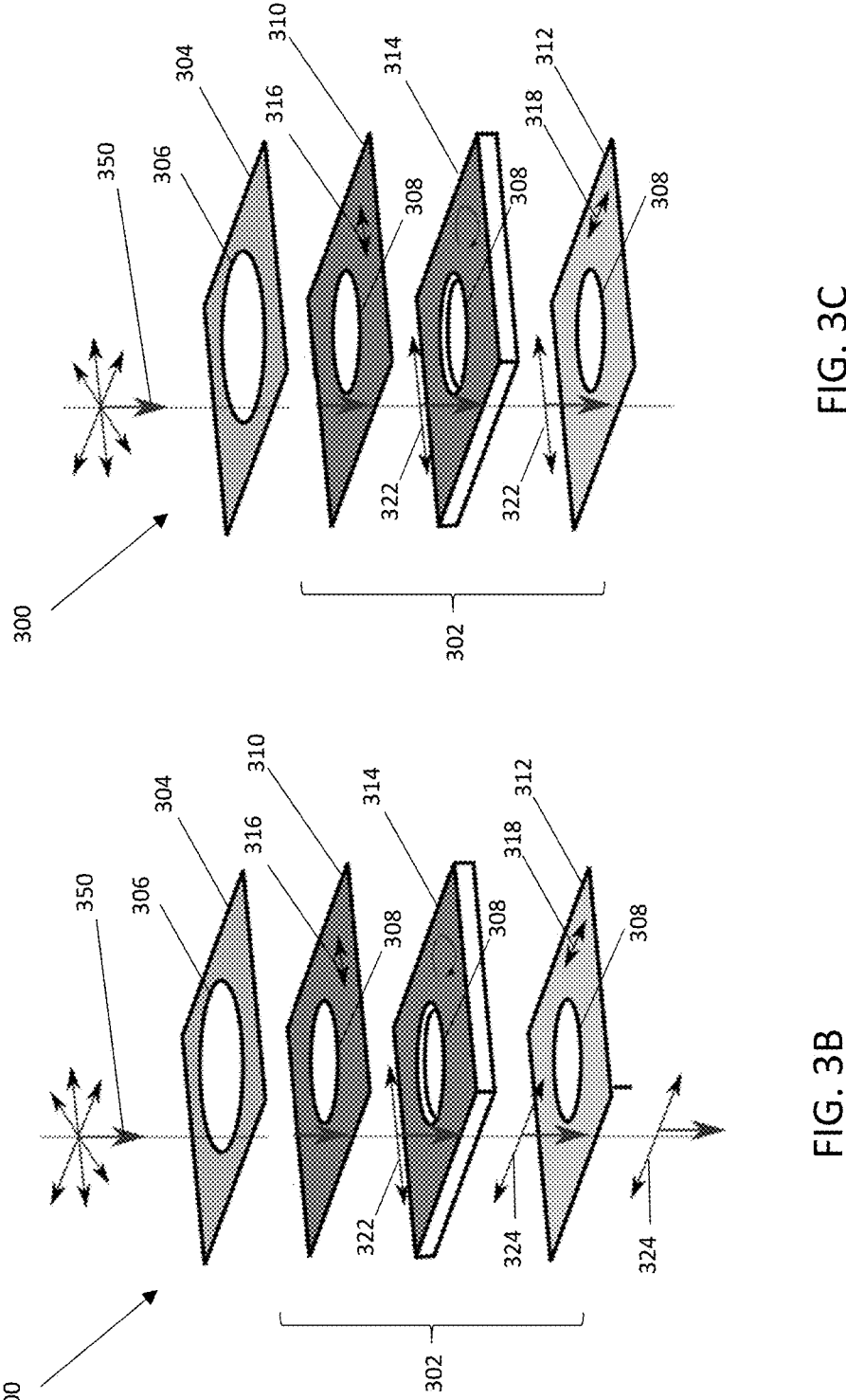

FIG. 3B illustrates the passage of light through the electro-optic shutter 302 when the electro-optic shutter 302 is controlled for passing light. Light that has passed through the first linear polarizer 310 is polarized in a first direction 322. When the control signal applied to the polarization rotator 314 is such that a ninety degree phase shift is imparted on a component of the electric field at forty-five degrees to that transmitted by the first linear polarizer 310, the polarization of the light is rotated as it passes through the polarization rotator 314 to a second direction 324 that is orthogonal to the first direction 322 such that it is polarized in the same plane transmitted by the second linear polarizer 312 (as indicated by transmission axis 318). Thus, light that passed through the first linear polarizer 310 passes through the second linear polarizer 312. The net result is that light within the hole 306 of the mechanical aperture 304 (including light passing through the hole 308 and the light passing within the annular region defined between the outside of hole 306 and the outside of hole 308) passes through the electro-optic shutter. Thus, the hole 306 defines the aperture size of the adjustable aperture 300 when the electro-optic shutter 302 is controlled for passing light.

FIG. 3C illustrates how light is blocked from passing through the electro-optic shutter 302 when the electro-optic shutter 302 is controlled for blocking light. When the control signal applied to the polarization rotator 314 is such that there is no rotation of the electromagnetic field transmitted by first linear polarizer 310, the light transmitted by the polarization rotator 314 continues to be polarized in the first direction 322. As such, the light reaching the second linear polarizer 314 is polarized in the first direction 322. Because the second linear polarizer 314 has its transmission axis 318 oriented orthogonally to the first direction 322, the light is blocked by the second linear polarizer 312. The net result is that light is only transmitted through the smaller hole 308 of the electro-optic shutter 302. Thus, the smaller hole 308 defines the size of the aperture of the adjustable aperture 300 when the electro-optic shutter 302 is controlled for blocking light.

There are two physical effects that can be used to produce the polarization rotation of the polarization rotator 314: Kerr effect and Pockels effect. Kerr effect is typically 1-2 orders of magnitude faster (switching rates up to 10 GHz), but requires higher voltages (e.g., can be up to 30 kV) and the materials used are liquids that may be toxic. Pockels effect usually dominates Kerr effect in solid media. Therefore, Pockels cells can be solid state (e.g., lithium niobate). Switching times for Pockels cells are typically a few nanoseconds (a switching rate of around 1 GHz), and required voltages (e.g., a few kV) are lower than required for the Kerr effect. As such, the polarization rotator 314 utilizing the Kerr effect can be or include a liquid crystal shutter that includes a liquid crystal layer positioned between positive and negative electrodes. Alternatively, the polarization rotator 314 utilizing the Pockels effect can include a Pockels cell—a solid state electro-optic crystal positioned between positive and negative electrodes. Using a Pockels cell instead of a liquid crystal layer may be preferable for imagers subject to sterilization and other cleaning processes involving heat and pressure. The aperture size switching rate of the adjustable aperture 300 is defined by the response time of the polarization rotator 314. As such, the polarization rotator 314 can provide switching times on the order of nanoseconds.

FIGS. 3A-3C illustrate an exemplary electro-optic shutter 302 that includes a hole 308 that extends through both linear polarizers 310, 312 and the polarization rotator 314. However, to simplify manufacturing and/or reduce manufacturing costs, the hole 308 need not be in each of these components. Rather, the hole 308 may be provided in only one of the linear polarizers 310, 312, with or without being provided in the polarization rotator 314, or may be provided in both of the linear polarizers but not the polarization rotator 314. When the hole 308 is not provided in one of the linear polarizers 310, 312, around 50% of the light incident on the electro-optic shutter 302 will be filtered out by the linear polarizer that does not have the hole 308. However, this loss may be acceptable for at least some applications.

Figure 8:
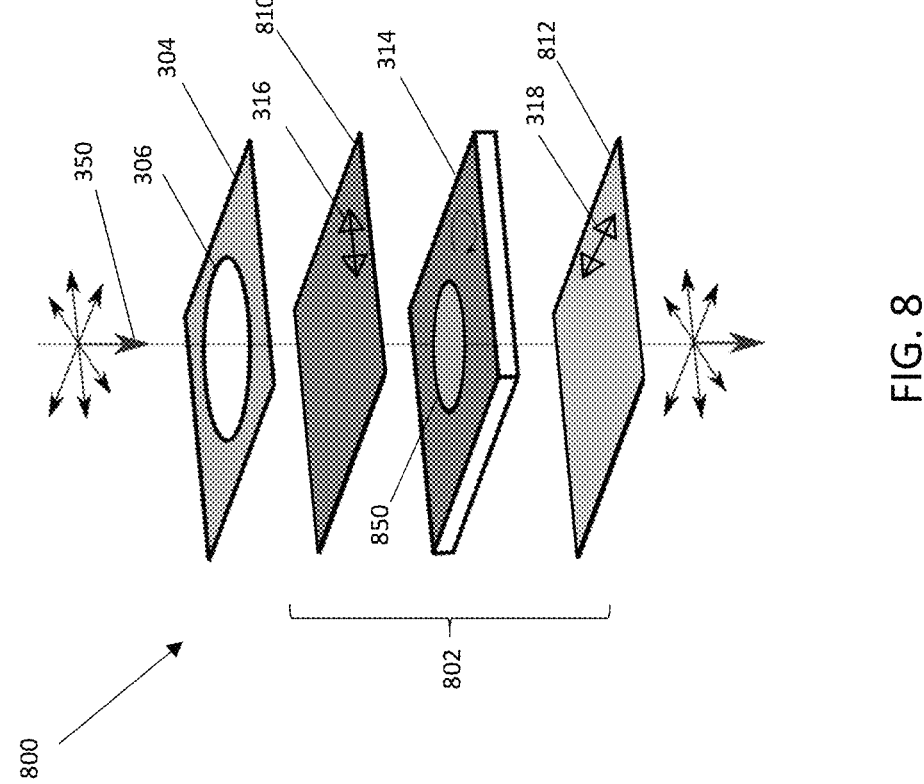
FIG. 8 is an exploded view of an exemplary adjustable aperture that include multiple polarization rotators.

Optionally, neither linear polarizer 310, 312 has a hole, and the hole 308 in the polarization rotator 314 is fitted with a second polarization rotator that is controllable separately from the polarization rotator 314. An example of such an arrangement is illustrated in FIG. 8. The adjustable aperture 800 of FIG. 8 includes an electro-optic shutter 802 that has linear polarizers 810 and 812 that do not have holes and a second polarization rotator 850 that can be controlled to, for example, always rotate polarization of the light such that light always passes through the center of the electro-optic shutter 802, similar to having a hole in at least one of the linear polarizers 310, 312. The polarization rotator 314 can be controlled independently of the second polarization rotator 850 to rotate or not rotate the polarization of the light passing through it to selectively change the aperture size, as discussed above. The second polarization rotator 850 can be configured to passively rotate polarization of light or can be actively controlled to be selectively rotating or not rotating polarization (and, thus, could be controlled to block all light, providing an electronic shutter effect) or can be configured to be always rotating so that light always passes through the central portion (the portion corresponding to the second polarization rotator 850) of the electro-optic shutter 802.

Imaging System with Adjustable Aperture

Figure 4:
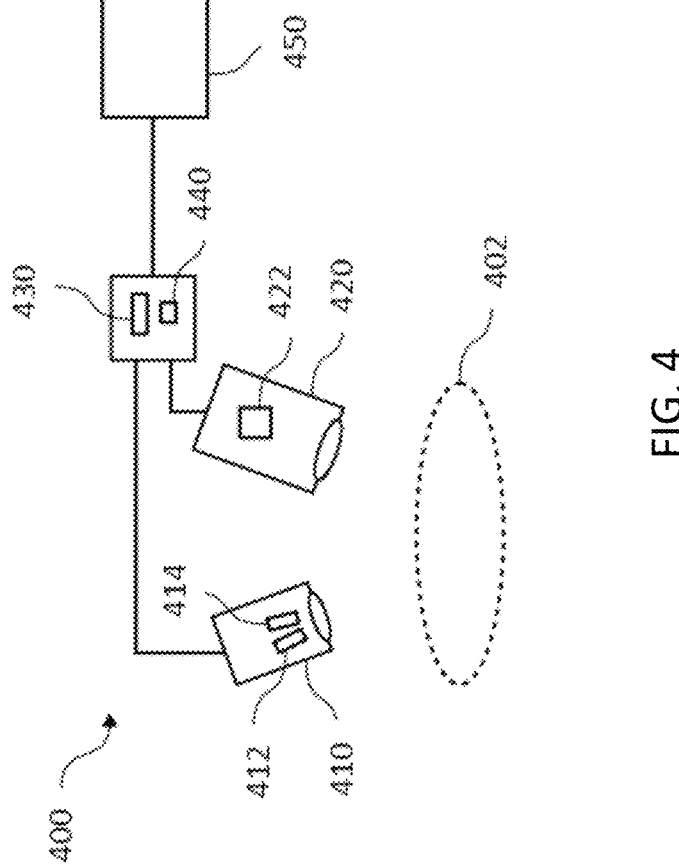
FIG. 4 illustrates an exemplary imaging system that includes an adjustable aperture.

An adjustable aperture, such as adjustable aperture 200 of FIG. 2, can be used in an imaging system configured for imaging in at least two different spectral bands. The imaging system can be configured for acquiring one or more time series of images of tissue and includes one or more processors and memory having instructions stored thereon, wherein the instructions when executed by the one or more processors cause the system to perform the methods substantially as described within for using an adjustable aperture for imaging in at least two spectral bands. FIG. 4 illustrates an exemplary imaging system 400 for imaging tissue 402 (e.g., a region of interest) in at least two different spectral bands. Imaging system 400 may include an image acquisition assembly 420 that includes at least one image sensor 422 configured to acquire a sequence of video frames depicting the tissue and/or one or more features of the tissue. The image acquisition assembly 420 may be or include imager 100 of FIG. 1.

Light Source Assembly

As shown in the schematic of FIG. 4, the imaging system 400 may include a light source assembly 410 including at least two light sources that emit light of different spectral bands. The light sources can be, for example, a visible light source 412 that emits visible light (e.g., full spectrum visible light, narrow band visible light, or other portions of the visible light spectrum) and an excitation light source 414 that emits excitation light for exciting fluorophores in the tissue 402 and causing fluorescence emission. In some examples, the fluorescence emission can be in a waveband outside the visible light spectrum, while in other examples the fluorescence emission can be in a waveband within or overlapping the visible light spectrum.

The visible light source 412 is configured to emit visible light for illumination of the object to be imaged. The visible light source may for example include one or more solid state emitters, such as LEDs and/or laser diodes. For example, the visible light source may include blue, green, and red (or other color components) LEDs or laser diodes that in combination generate white light illumination. These color component light sources may be centered around the same wavelengths around which the image acquisition assembly (described further below) is centered. For example, in variations in which the image acquisition assembly includes a single chip, single color image sensor having an RGB color filter array deposited on its pixels, the red, green, and blue light sources may be centered around the same wavelengths around which the RGB color filter array is centered. As another example, in variations in which the image acquisition assembly includes a three-chip, three-sensor (RGB) color camera system, the red, green, and blue light sources may be centered around the same wavelengths around which the red, green, and blue image sensors are centered.

The excitation light source 414 is configured to emit excitation light suitable for exciting intrinsic fluorophores and/or extrinsic fluorophores (e.g., a fluorescence imaging agent introduced into the object) located in the tissue being imaged. The fluorescence imaging agent may have been pre-administered prior to imaging. The excitation light source 414 may include, for example, one or more LEDs, laser diodes, arc lamps, and/or illuminating technologies of sufficient intensity and appropriate wavelength to excite the fluorophores located in the object being imaged. For example, the excitation light source may be configured to emit light in the near-infrared (NIR) waveband (such as, for example, approximately 805 nm light), though other excitation light wavelengths may be appropriate depending on the application. As another example, the excitation light source may be configured to emit light in a lower waveband such as to excite a fluorophore with an emission waveband within or overlapping the visible spectrum.

The light source assembly 410 can be configured for generating any desired spectral bands, including more than two spectral bands. For example, the light source assembly 410 can be configured to provide two different excitation wavebands for exciting two or more different types of fluorophores in the tissue (with or without also providing visible light).

Figure 5:
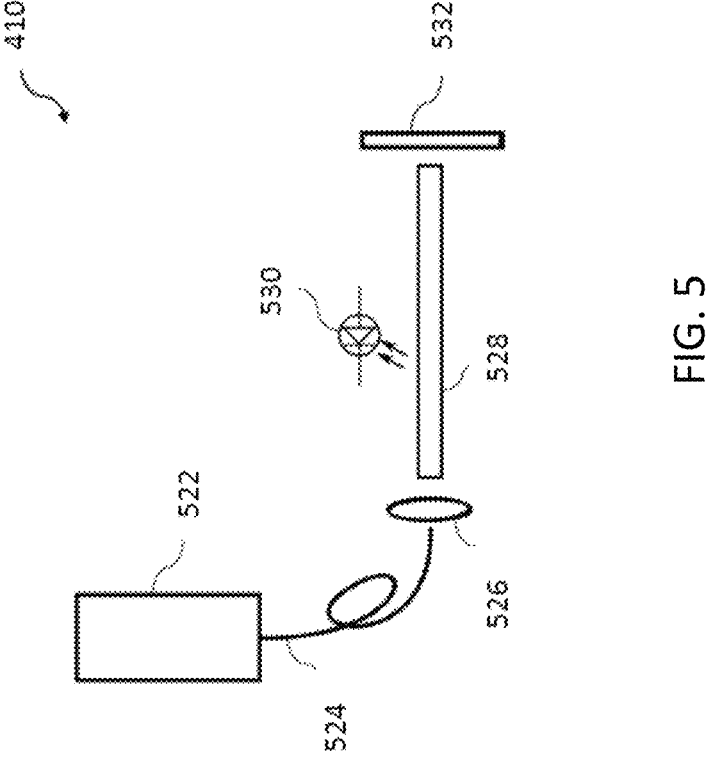
FIG. 5 illustrates aspects of an exemplary light source assembly.

The light source assembly 410 may further include one or more optical elements that shape and/or guide the light output from the visible light source 412 and/or excitation light source 414. The optical components may include one or more lenses, mirrors (e.g., dichroic mirrors), light guides and/or diffractive elements, e.g., so as to help ensure a flat field over substantially the entire field of view of the image acquisition assembly 420. For example, as shown in the schematic of FIG. 5, the output 524 from a laser diode 522 (providing visible light or excitation light) may be passed through one or more focusing optics, such as focusing lenses 526, and then through a light guide 528. The light may be further passed through an optical diffractive element 532 (e.g., one or more optical diffusers). Power to the laser diode 522 may be provided by, for example, a high-current laser driver and may optionally be operated in a pulsed mode during the image acquisition process according to a timing scheme. An optical sensor such as a solid state photodiode 530 may be incorporated into the light source assembly and may sample the illumination intensity produced by one or more of the light sources, via scattered or diffuse reflections from the various optical elements.

Image Acquisition Assembly

Figure 6:
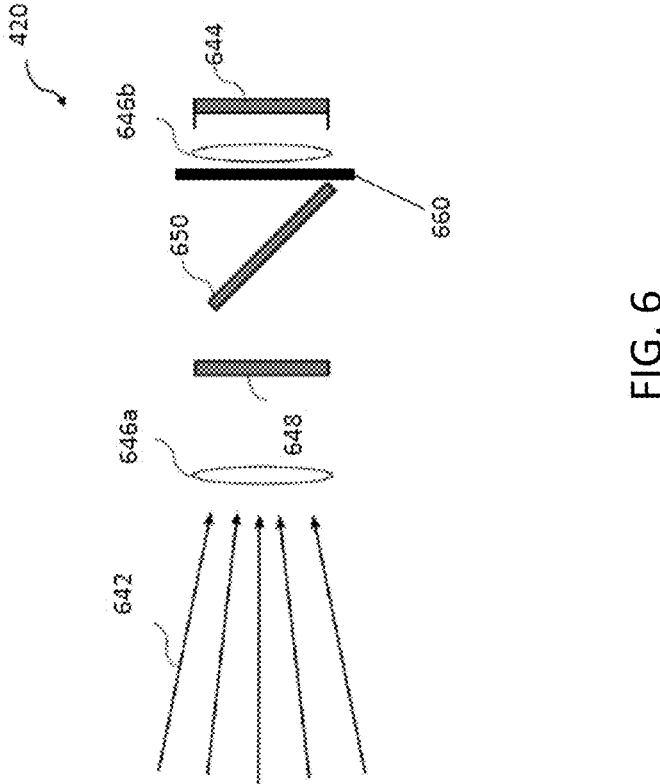
FIG. 6 illustrates aspects of an exemplary image acquisition assembly that includes an adjustable aperture.

The image acquisition assembly 420 may acquire reflected light video frames based on visible light that has reflected from the object, and/or fluorescence video frames based on fluorescence emitted by fluorophores in the object that are excited by the fluorescence excitation light. As shown in the example of FIG. 6, the image acquisition assembly 420 may acquire images using a system of optics (e.g., one or more lenses 646*a*, one or more filters 648, one or more mirrors 650, beam splitters, etc.) and an adjustable aperture 660 (such as adjustable aperture 200 of FIG. 2) to collect and focus reflected light and/or fluorescent light 642 onto an image sensor assembly 644. The image sensor assembly 644 may include at least one solid state image sensor. The one or more image sensors may include, for example, a charge coupled device (CCD), a CMOS sensor, a CID, or other suitable sensor technology. The image sensor assembly 644 may include a single chip, single image sensor (e.g., a grayscale image sensor or a color image sensor having an RGB color filter array deposited on its pixels). In another variation, the image acquisition assembly may include a three-chip, three-sensor (RGB) image sensor assembly 644.

Processor and Controller

As shown in the schematic of FIG. 4, the system 400 may include a processor 430. The processor 430 may include, for example, a microprocessor or other suitable central processing unit. In particular, the processor 430 may be configured to execute instructions to perform aspects of the methods described herein. As visible light frames and/or fluorescence frames are acquired, at least a portion may be stored in a memory unit for record-keeping purposes and/or retrieval for analysis during other aspects of the method, as described below.

As shown in the schematic of FIG. 4, the system may include a controller 440, which may be embodied in, for example, a microprocessor and/or timing electronics. In some variations, a single image sensor may be used to acquire both visible light video frames and fluorescence frames, and the controller 440 may control a timing scheme for the visible light source and/or the excitation light source, and the image acquisition assembly. This timing scheme may enable separation of the image signal associated with the visible light signal and the image signal associated with the fluorescence signal. In particular, the timing scheme may involve illuminating the object with illumination light and/or excitation light according to a pulsing scheme. The timing scheme may involve processing the visible light image signal and fluorescence image signal with a processing scheme. The processing scheme can be synchronized and matched to the pulsing scheme (e.g., via a controller) to enable separation of the two image signals in a time-division multiplexed manner. Examples of such pulsing and image processing schemes have been described in U.S. Pat. No. 9,173,554, filed on Mar. 18, 2009 and titled "IMAGING SYSTEM FOR COMBINED FULL-COLOR REFLEC-TANCE AND NEAR-INFRARED IMAGING," the contents of which are incorporated in their entirety by this reference. However, other suitable pulsing and image processing schemes may be used to acquire reference video frames and low light video frames simultaneously, for example to acquire reflected light video frames and fluorescence video frames simultaneously. Furthermore, the controller may be configured to control the timing scheme for the visible light source and/or the excitation light source, and the image acquisition assembly based at least in part on the relative movement between the image acquisition assembly and the object.

Optionally, the controller 440 can be configured to control the switching of the adjustable aperture or provide a timing signal to a separate controller of an imager for controlling the switching of the adjustable aperture. Thus, the switching can be coordinated with the timing scheme for the visible and fluorescence frames. For example, the controller 114 of the imager 100 may receive timing information from the controller 440 and may switch the adjustable aperture 102 accordingly, such as to control the adjustable aperture 102 to its larger aperture size for fluorescence frames, when sensitivity may be prioritized over depth of field, and to its smaller aperture size for visible light frames, when depth of field may be prioritized.

Other Hardware

In some variations, the system may include image stabilizing technology that helps compensate for some ranges of motion (e.g., caused by unsteady hands holding the image acquisition assembly) in the acquired images. The image stabilizing technology may be implemented in hardware, such as with optical image stabilization technology that counteracts some relative movement between the image acquisition assembly and the object by varying the optical path to the image sensor (e.g., lens-based adjustments and/or sensor-based adjustments). Additionally, or alternatively, the image stabilization technology may be implemented in software, such as with digital image stabilization that counteracts some relative movement between the image acquisition assembly and the object (e.g., by shifting the electronic image between video frames, utilizing stabilization filters with pixel tracking, etc.). Such image stabilizing technology may, for example, help correct for motion blur in the characteristic low light video output (or in the acquired low light video frames) resulting from relative motion during long exposure periods.

The system may include one or more hardware motion sensors (e.g., gyroscope, accelerometer) that measure absolute motion of the image acquisition assembly. Information from these motion-measuring sensors may be used, in addition or as an alternative to the above-described motion-estimation algorithms, to determine which imaging mode of the system is suitable for a given set of circumstances.

Additionally, the system may include one or more data modules 450 that communicates and/or stores some or all of the acquired frames and/or information generated from the image data. For instance, the data module 450 may include a display (e.g., computer screen or other monitor), recorder or other data storage device, printer, and/or picture archiving and communication system (PACS). The system may additionally or alternatively include any suitable systems for communicating and/or storing images and image-related data.

In general, the imaging system 400 may be used in conjunction with a range of surgical and non-surgical methods. For example, the imaging system 400 may be used in non-invasive imaging sessions that may or may not include treatment, in "open" surgical procedures, or in minimally invasive surgical procedures, sometimes referred to as band-daid or keyhole surgeries. In open procedures, an incision sufficiently large to expose the entire operative area is made with a scalpel or other knife and tissue of interest may be imaged using an imaging system 400 configured as an open-field imaging system. The incision can be pre-made prior to imaging. In minimally invasive surgeries, one or more much smaller incisions are typically made, through which a laparoscope and/or other endoscopic tools of an endoscopic imaging system 400 may be inserted to allow a surgeon to view and/or surgically manipulate a patient's organs and/or tissues. The laparoscope and/or other endoscopic tools can be pre-inserted prior to imaging.

Methods for Imaging with an Adjustable Aperture

Figure 7:
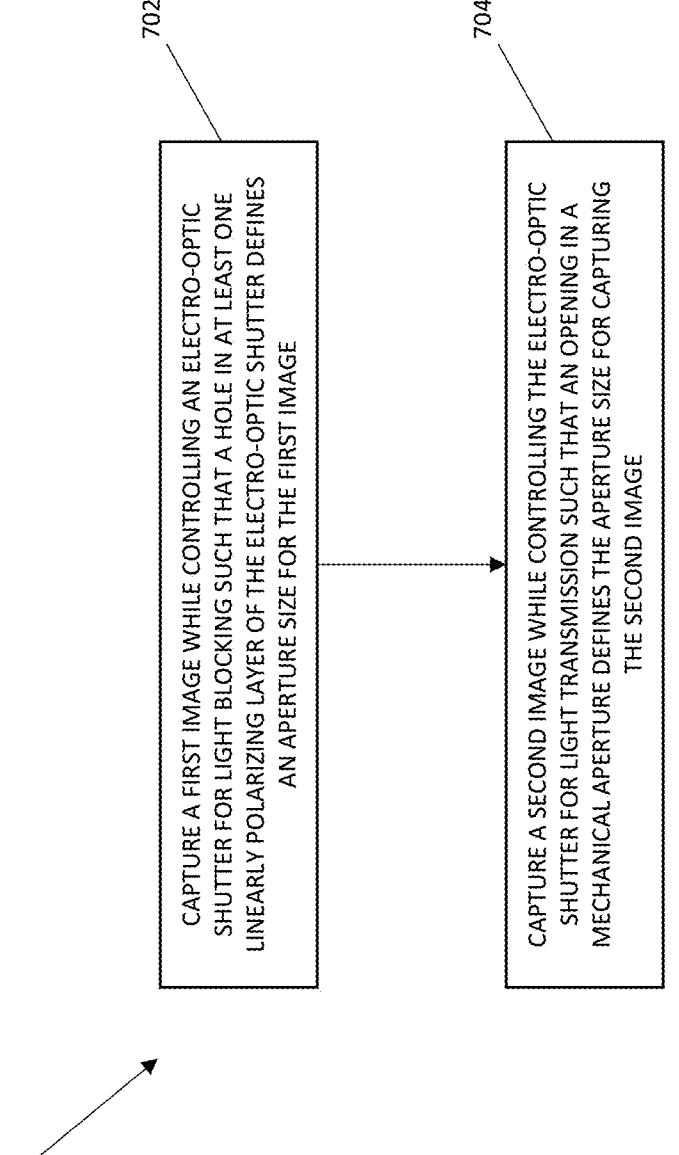
FIG. 7 is a diagram of a method for imaging using an imager having an adjustable aperture.

FIG. 7 is a diagram of a method 700 for imaging using an imager having an adjustable aperture. Method 700 may be performed by any of the imaging systems described herein, including system 100 of FIG. 1 and/or system 400 of FIG. 4. Method 700 can be used for imaging in at least two different spectral bands with different aperture settings for each.

At step 702, a first image is captured by an imager while controlling an electro-optic shutter of the imager for light blocking. The electro-optic shutter can be, for example, electro-optic shutter 202 of adjustable aperture 200. The electro-optic shutter includes a hole in at least one linearly polarizing layer of the electro-optic shutter such that light passes through the hole but not through the portion of the electro-optic shutter that is outside of the hole. The hole in the electro-optic shutter defines the aperture size for the first image.

At step 704, a second image is captured by the imager while controlling the electro-optic shutter for light transmission. As described above, the adjustable aperture includes a mechanical aperture having a larger diameter hole than that of the electro-optic shutter. As such, with the electro-optic shutter controlled for light transmission, the larger diameter hole of the mechanical aperture defines the aperture size for the second image.

The first and second images may be captured sequentially at a video frame rate. For example, each frame may be capture at a frame rate of at least 24 frames per second, at least 30 frames per second, at least 60 frames per second, at least 120 frames per second, or at least 240 frames per second. As such, the aperture size may be switched at the same rate.

The first and second images can be associated with different spectral bands. For example, the first image can be a visible light image and the second image can be a fluorescence image. The first image can be captured from visible light received from the scene at the imager while illuminating the scene with visible light. The smaller aperture size used for capturing the first image can provide increased depth of field relative to the larger aperture size used for the second image, which can provide improved clarity throughout the scene. The smaller aperture size reduces the amount of light received at the sensor(s) relative to the larger size aperture, but sufficient illumination of the scene may ensure sufficient light reaches the sensor(s) for a sufficiently bright image. The second image can be captured from fluorescence light emitted by fluorophores in the scene based on fluorescence excitation light provided to the scene. Relative to the visible light image, the amount of fluorescence light available for generating an image is significantly less. As such, the greater sensitivity provide the larger aperture size relative to the smaller aperture size can provide a brighter fluorescence image relative to a system that has a fixed aperture size. While depth of field is sacrificed for the higher sensitivity, depth of field effects on a fluorescence image are often not noticeable because of the lack of fine detail.

The first and second images are not limited to visible and fluorescence light image. Rather, the first and second images can each be associated with any desirable spectral bands in which there may be different desirable balance between sensitivity and depth of field. For example, the first and second image can be associated with different fluorescence spectral bands where more light in one spectral band reaches the imager than in the other spectral band. For example, the first image can be captured from fluorescence light emitted by a first type of fluorophore and the second image can be capture from fluorescence light emitted by a second type of fluorophore, where more fluorescence light is emitted during fluorescing of the second fluorophore than during fluorescing of the first fluorophore. The scene may be illuminated with different fluorescence excitation light during capture of the first and second image.

The first and second images may be combined into a single displayed image or video stream. For example, the first and second images may be combined into an overlay image or video stream in which information from one of the two images is overlaid on or otherwise combined with the other of the two images. For example, fluorescence data from a fluorescence image can be overlaid on a visible light image. The displayed video may have a smaller frame rate than the frame rate used for capturing the first and second images. For example, with the first and second images combined into an overlay, the displayed video frame rate may be half of that used for capturing the first and second images (e.g., the first and second images may be captured at 120 frames per second and a displayed video may have a frame rate of 60 frames per second).

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. An adjustable aperture for an imager comprising:
a mechanical aperture having an opening for permitting light to pass through the mechanical aperture; and
an electro-optic shutter comprising a plurality of layers that include at least one linearly polarizing layer, wherein a hole extends through each layer of the plurality of layers of the electro-optic shutter such that at least a portion of light arriving at the electro-optic shutter can pass through the electro-optic shutter regardless of an operating state of the electro-optic shutter,
wherein an aperture size of the adjustable aperture is defined by the mechanical aperture when the electro-optic shutter is controlled for light transmission and by the electro-optic shutter when the electro-optic shutter is controlled for light blocking.

2. The adjustable aperture of claim 1, wherein the electro-optic shutter comprises two linearly polarizing layers that both have the hole.

3. The adjustable aperture of claim 1, wherein the mechanical aperture is positioned on a surface of the electro-optic shutter.

4. The adjustable aperture of claim 1, wherein the opening of the mechanical aperture is fixed in size.

5. The adjustable aperture of claim 1, wherein the electro-optic shutter comprises a liquid crystal shutter.

6. The adjustable aperture of claim 1, wherein the electro-optic shutter comprises a Pockels cell.

7. The adjustable aperture of claim 1, wherein the electro-optical shutter can be controlled to switch the aperture size at a video frame rate.

8. An imaging system comprising:
at least one imaging sensor;
an adjustable aperture, the adjustable aperture comprising:
a mechanical aperture having an opening for permitting light to pass through the mechanical aperture, and
an electro-optic shutter having a hole in at least one linearly polarizing layer such that at least a portion of light directed through the hole in the at least one linearly polarizing layer can pass through the electro-optic shutter regardless of the operating state of the electro-optic shutter,
wherein an aperture size of the adjustable aperture is defined by the mechanical aperture when the electro-optic shutter is controlled for light transmission and by the electro-optic shutter when the electro-optic shutter is controlled for light blocking; and
a controller comprising one or more processors configured to control the adjustable aperture to adjust the aperture size, wherein the system is configured for capturing a series of frames in alternating spectral bands, and the controller is configured for controlling the adjustable aperture such that the aperture size is defined by the mechanical aperture for at least a first spectral band and by the electro-optic shutter for at least a second spectral band that is different than the first spectral band.

9. The imaging system of claim 8, wherein the controller can control the electro-optical shutter to adjust the aperture size at a video frame rate of the at least one imaging sensor.

10. The imaging system of claim 9, wherein the video frame rate is at least 60 frames per second.

11. The imaging system of claim 8, wherein the first spectral band is a fluorescence light band and the second spectral band is a visible light band.

12. The imaging system of claim 11, wherein the fluorescence light band is within or overlaps the visible light band.

13. The imaging system of claim 8, wherein the electro-optic shutter comprises two linearly polarizing layers that both have the hole.

14. The imaging system of claim 8, wherein the hole extends through each layer of the electro-optic shutter.

15. The imaging system of claim 8, wherein the mechanical aperture is positioned on a surface of the electro-optic shutter.

16. The imaging system of claim 8, wherein the opening of the mechanical aperture is fixed in size.

17. The imaging system of claim 8, wherein the electro-optic shutter comprises a liquid crystal shutter.

18. The imaging system of claim 8, wherein the electro-optic shutter comprises a Pockels cell.

19. The imaging system of claim 8, wherein the electro-optical shutter can be controlled to switch the aperture size at least at a frame rate of video generated by the imaging system.

20. A method for imaging using an imager having an adjustable aperture comprising:

capturing a first image while controlling an electro-optic shutter for light blocking such that a hole in at least one linearly polarizing layer of the electro-optic shutter defines an aperture size for the first image; and capturing a second image while controlling the electro-optic shutter for light transmission such that an opening in a mechanical aperture defines the aperture size for capturing the second image, wherein the first image is generated from light having a first spectral band and the second image is generated from light having a second spectral band that is different than the first spectral band.

21. The method of claim 20, further comprising generating a video using the first and second images.

22. The method of claim 21, wherein the first and second images are captured sequentially and combined into a frame of the video.

23. The method of claim 20, wherein the first and second images are captured sequentially at least at 60 frames per second.

24. The method of claim 20, wherein the first spectral band is a visible light band and the second spectral band is a fluorescence light band.

25. The method of claim 24, wherein the fluorescence light band is within or overlaps the visible light band.

26. The method of claim 20, wherein the electro-optic shutter comprises two linearly polarizing layers that both have the hole.

27. The method of claim 20, wherein the hole extends through each layer of the electro-optic shutter.

28. The method of claim 20, wherein the mechanical aperture is positioned on a surface of the electro-optic shutter.

29. The method of claim 20, wherein the opening of the mechanical aperture is fixed in size.

30. The method of claim 20, wherein the electro-optic shutter comprises a liquid crystal shutter.

31. The method of claim 20, wherein the electro-optic shutter comprises a Pockels cell.

32. An adjustable aperture for an imager comprising:

a mechanical aperture having an opening for permitting light to pass through the mechanical aperture; and an electro-optic shutter comprising at least one linearly polarizing layer, a first polarization rotator, and a second polarization rotator disposed within a central portion of the first polarization rotator, wherein the second polarization rotator is controllable independently of the first polarization rotator.

33. The adjustable aperture of claim 32, wherein the at least one linearly polarizing layer does not comprise a hole.

34. The adjustable aperture of claim 32, wherein the second polarization rotator is controllable to block all the light.

35. The adjustable aperture of claim 32, wherein the electro-optical shutter comprises two linearly polarizing layers disposed on opposing sides of the first and second polarization rotators.

36. The adjustable aperture of claim 32, wherein the mechanical aperture is positioned on a surface of the electro-optic shutter.

37. The adjustable aperture of claim 32, wherein the opening of the mechanical aperture is fixed in size.

38. The adjustable aperture of claim 32, wherein the electro-optic shutter comprises a liquid crystal shutter.

39. The adjustable aperture of claim 32, wherein the electro-optic shutter comprises a Pockels cell.

* * * * *